United States Patent [19]

Alafandi et al.

[11] 4,259,210
[45] * Mar. 31, 1981

[54] CRYSTALLINE ALUMINO SILICATE-SILICA-ALUMINA GEL HYDROCARBON CONVERSION CATALYSTS AND PROCESSES FOR PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[*] Notice: The portion of the term of this patent subsequent to Jan. 20, 1998, has been disclaimed.

[21] Appl. No.: 44,677

[22] Filed: Jun. 1, 1979

Related U.S. Application Data

[63] Continuation-in-part of Ser. No. 3,793, Jan. 16, 1979, Ser. No. 935,628, Aug. 21, 1978, Ser. No. 874,755, Feb. 3, 1978, Pat. No. 4,198,310, Ser. No. 874,754, Feb. 3, 1978, and Ser. No. 769,118, Feb. 16, 1977, Pat. No. 4,142,995.

[51] Int. Cl.³ .................. B01J 27/24; B01J 27/02; B01J 29/06

[52] U.S. Cl. .................. 252/438; 252/440; 252/455 R; 252/455 Z

[58] Field of Search .................. 252/438, 440, 455 R, 252/455 Z

[56] References Cited

U.S. PATENT DOCUMENTS

| | | | |
|---|---|---|---|
| 3,346,512 | 10/1967 | Gladrow et al. | 252/455 Z |
| 3,423,332 | 1/1969 | Maher et al. | 252/455 R |
| 3,437,604 | 4/1969 | Micholko | 252/455 Z |
| 3,536,604 | 10/1970 | Jofpe | 252/455 Z |
| 3,551,509 | 12/1970 | Thomas et al. | 252/455 Z |
| 4,085,069 | 4/1978 | Alafandi et al. | 252/455 Z |
| 4,139,493 | 2/1979 | Mickelson | 252/455 R |
| 4,142,995 | 3/1979 | Alafandi et al. | 252/455 Z |

*Primary Examiner*—Delbert E. Gantz
*Assistant Examiner*—William G. Wright
*Attorney, Agent, or Firm*—Subkow & Kriegel

[57] ABSTRACT

This invention relates to catalysts containing crystalline alumino-silicate zeolite and hydrothermally treated silica-alumina cogels and the employment of the same as cracking catalysts.

9 Claims, No Drawings

CRYSTALLINE ALUMINO SILICATE-SILICA-ALUMINA GEL HYDROCARBON CONVERSION CATALYSTS AND PROCESSES FOR PRODUCING SAME

BACKGROUND OF THE INVENTION

This application is a continuation-in-part of applications, Ser. No. 935,628; filed Aug. 21, 1978; and Ser. No. 769,118; filed Feb. 16, 1977 now U.S. Pat. No. 4,142,995 and Ser. No. 874,755; filed Feb. 3, 1974 now U.S. Pat. No. 4,198,310 and of application Ser. No. 874,754, filed Feb. 3, 1978, and application Ser. No. 3,793, filed Jan. 16, 1979.

In the aforesaid applications Ser. No. 935,628 and copending application Ser. No. 3,879; filed Jan. 16, 1979, and Ser. No. 9,487; filed Feb. 5, 1979, we have disclosed our invention whereby silica-alumina cogels may be hydrothermally treated to produce active catalysts. In application Ser. No. 874,754 and U.S. Pat. No. 4,058,484, we have disclosed our inventions whereby sodium containing zeolites are exchanged under pressure to reduce the sodium content of the zeolite and to include other cations into the zeolite.

In our copending applications, Ser. No. 874,755 and application Ser. No. 769,118 we have disclosed our inventions for combining the silica alumina cogel with the zeolite, either by mixing the cogel with the zeolite or encapsulating the zeolite with the silica-alumina cogel.

In our copending applications Ser. No. 935,628, Ser. No. 3,879, and Ser. No. 9,487, we have disclosed our invention relating to the improvement of the catalytic cracking activity of silica-alumina cogels which are substantially free of sodium is improved by digesting the cogel at an elevated temperature in the presence of solutions containing hydrogen, ammonium or polyvalent cations such as rare earth or alkaline earth cations. The above Applications are incorporated herein by this reference. Reference may be made to the above Applications for a discussion of the prior art.

STATEMENT OF THE INVENTION

This application relates to combinations of hydrothermally treated silica-alumina gels with crystalline alumina silicate zeolites (CAS), having low content of alkali metal and to methods of producing the same. Such CAS zeolites include the sieve zeolites, for example, faujasite, for example, the so-called molecular X and Y zeolites. (See Milton, U.S. Pat. No. 2,822,244 and Breck, U.S. Pat. No. 3,130,007), and mordanite.

The gel may, according to our invention, be separately treated in the presence of a monovalent cation other than alkali metal cation for example H, NH$_4$ alkaline earth or rare earth cations and combined with the crystalline aluminosilicate (CAS) zeolite which has a suitable low alkali metal content.

Instead, the CAS zeolite having a relatively high alkali metal content is combined with the cogel and the mixture is hydrothermally treated to hydrothermally activate the cogel and reduce the alkali metal content of the CAS zeolite. (See our U.S. Pat. No. 4,085,069, and copending application Ser. No. 869,856, filed Jan. 16, 1978, and Ser. No. 877,754, filed Feb. 3, 1978, and Ser. No. 808,268, filed June 20, 1977.

The combination of the CAS zeolite and the cogel according to our invention may be made by mixing the GAS zeolite having a relatively high alkali metal content with the gel forming ingredients to encapsulate the CAS zeolite and to hydrothermally treat the mixture to so activate the gel and reduce the sodium content of the CAS zeolite.

The gels which are treated according to our invention may be formed by any of the procedures employed in the prior art.

Gels which have ammonium cations associates with the gel are herein referred to as ammoniated gels. Such gels for example may contain substantial concentrations of ammonium cations.

Gels may also be formed substantially free of ammonium cations by reacting sodium aluminate with an aluminum salt and maintaining the mixture on the acid side. The sodium content of the acid gel may be similar to that of the ammoniated gel. We refer to such gels as acid gels.

While the hydrothermal treatment of the acid gel according to the process of our invention produces a gel of substantial catalytic activity superior activity is obtained by treatment of the ammoniated gel.

In the case of the ammoniated gels the improvement in catalytic activity obtained by the hydrothermal treatment is increased by treatment at a temperature in excess of about 150° F. In such ammoniated gels, preferably those containing SiO$_2$/Al$_2$O$_3$ molar ratio of less than about 3, substantially free of sodium cations, the catalytic activity of the gel is increased to a degree which is dependent on the concentration of the ammonium cation associated with the treated gel. Preferably the NH$_4$ content of the gel, expressed as NH$_3$, is in the range from less than about 0.3 and preferably less than 0.2 equivalents of ammonium per mole of Al$_2$O$_3$.

The activity produced from such gels depends on the conditions of the hydrothermal treatment and the ionic system. A crystalline phase may develop or the gel may remain amorphous and a reduction in the ammonium content of the gel and an increase in the catalytic activity of the gel may be obtained in both cases.

The process of our invention includes the treatment of a silica-alumina cogel containing less than about 1% of Na$_2$O based on the cogel on a volatile free basis by a hydrolytic treatment of the gel. The hydrolyses may be carried out in the presence of monovalent cations other than alkali metal cations such as hydrogen or ammonium or polyvalent cations such as rare earth cations or alkaline metal cations. We prefer to carry out the hydrothermal treatment under acid conditions rather than at higher pH as for example under alkaline conditions. A superior amplification in the activity on reductions in ammonium content in the gel is obtained by treatment under acid conditions.

Under relatively mild and controlled hydrothermal conditions of temperatures below about 300° F., the reaction of the gel having low Na$_2$O content, results in an amorphous gel which exhibits superior catalytic activity as compared with the original gel. At temperatures above about 300° F. and at suitable concentrations of cations and time of digestion a crystalline phase develops.

The crystalline phase generated under acid conditions by reactions with rare earth salts under temperature in excess of 300° F. have an activity which is characteristic of the so called ultra-stable cracking catalysts.

The crystalline phase is characterized by an X-Ray spectrum in which characteristic peaks occur.

Excessive exposure of the gel for prolonged periods of time particularly at the higher temperatures may deliteriously affect the catalytic activity of the deammoniated gel although a successful reduction in ammonium content is achieved.

For purposes of describing the result of the process of treating the ammoniated gel with water or a solution of a salt, whereby the $NH_4$ content of the gel is reduced, we refer to the process as an "exchange" and the cation as "associated" with the gel.

The reduction in the ammonium content of the cogel by the process of our invention occurs in the presence of acid hydrogen or ammonium salts that is in the absence of metallic cations. We observe, however, that in the case of such hydrothermal treatment with polyvalent cations the treated gel has associated therewith the polyvalent cations employed in the hydrothermal treatment. The polyvalent cations may be alkaline earth cations or the metallic cations of the transition element or the lanthanide series of the periodic table with rare earth cations of Group 3b and the lanthanide period of the periodic table preferred. Such rare earth cations are available commercially as mixtures (see infra).

The hydrothermal treatment improves the activity of the silica-alumina gel whether the gel is ammoniated or is an acid gel.

When the acid cogel of substantially the same $SiO_2/Al_2O_3$ molar ratio, which is the same as in the case of ammoniated gel, that is one free of ammonium cations, is reacted with rare earth cations under hydrothermal conditions, we obtained an amorphous gel of substantial activity but of an activity inferior to that produced by like treatment of an ammoniated gel.

We prefer to hydrothermally treat the ammoniated silica-alumina cogel in the presence of a water solution of rare earth salts under acid conditions preferably at a pH from about 4 to about 6 and at temperatures in the range of about 150° F. to about 450° F. under suitable autogenous pressure conditions for a period of about two to four hours. Excessive temperatures or excessive acidity or excessive duration of treatment will depreciate the resultant activity, from that which is obtained under the more controlled reaction conditions.

The gel is mixed with water or water containing a suitable salt, acidified, if necessary to the desired pH, and then heated at temperatures from about 150° F. to about 450° F. under autogenous pressure where the temperature is above the boiling point. In such cases a temperature is selected to be in the range between about 250° F. and 450° F.

The crystalline-alumino silicate zeolite which may be combined with the cogel according to our invention includes the so called molecular sieve zeolites. (See Breck, "Zeolite Molecular Sieve" published by John Wiley & Company, 1974), preferably the zeolite which we wish to employ are of the faujasite type, that is the so called X zeolites (see Milton, U.S. Pat. No. 2,882,244) or the so called Y zeolite (see Breck, U.S. Pat. No. 3,130,007).

The gel and zeolite may, but need not, be combined with a matrix material, such as kaolin clays, for example bali clay or halloysite, or acid treated halloysite or an inorganic oxide gel, for example silica gel or the hydrated alumina such as pseudoboehmite and mixtures thereof. Such matrix materials, have been used with faujasite type catalysts in the prior art and are useful additives with the treated gels of our invention. The art of incorporating matrix materials with active catalysts, such as for example zeolites, is well known and such matrix compositions may be employed with the treated cogels of our invention.

The cogel, which we prefer to treat by the process of our invention to form the catalyst of our invention may be produced by any of the methods used in the prior art to form such cogels in which the treatment results in a gel having an ammonium ion associated with gel as in the ammoniated gel referred to above.

The cogel, which may be hydrothermally treated according to our invention, may be formed by treating a mixture of silica hydrosol with aluminum salt in the ratios to produce a gel of the desires $SiO_2/Al_2O_3$ ratio and exchanged with ammonium cation to reduce the sodium content of the gel.

We prefer to coprecipitate the silica-alumina hydrosol to form the gel from a mixture of sodium silicate and aluminum salt, e.g. aluminum sulfate, or aluminum nitrate or aluminum chloride made alkaline with ammonium hydroxide to reduce the sodium content as is more fully described below.

We have found that the improvement in the catalytic activity of a gel treated according to our invention depends on the silica to alumina ratio of the cogel. The ammonia content of the ammoniated gel of our invention depends on the silica to alumina ratio of the gel. The catalytic activity attainable by our invention is substantially greater as the molar weight ratio of $SiO_2$ to $Al_2O_3$ is less than about 3 and preferably about 1 to about 2.

Our preferred embodiment of our invention is to employ an ammoniated silica-alumina cogel having an $SiO_2/Al_2O_3$ molar ratio in the range of about 1.25 to about 2.5, and an ammonium ion content of less than about 0.3 equivalents of ammonium cation per mole of $Al_2O_3$ to form a catalyst having an M activity in excess of 60%.

The preferred embodiment of the process for producing the preferred embodiment of the cogel crystalline zeolite of our invention is to hydrothermally treat an ammoniated cogel with an acid solution of rare earth cations at an elevated temperature to reduce the ammonia content of the gel as stated above. While we have found that the reaction conditions which produce an exchanged cogel of low ammonium content and which has a high M activity may also contain a crystalline phase of characteristic x-ray spectrum, gels which are produced under milder conditions may also be amorphous and have superior M and S+ activities.

The activity of the catalyst of our invention may be measured by the microactivity cracking test described in the Oil and Gas Journal of Sept. 16, 1966; page 48, etc., and Nov. 22, 1975; page 60, etc.

In the following examples the conditions in carrying our the above tests is as follows. The calcined pelleted catalyst was first steamed at temperatures and for times specified below and then used in cracking of a petroleum fraction under the following conditions. The oil charge is alkali metal cation, or exchanged with a polyvalent cation, may be encapsulated in the cogel by mixing the zeolite with the gel forming ingredients. The mixture may then be hydrothermally treated to reduce the sodium content according to the process of our invention.

The mixture of zeolite and hydrothermally treated gel may be supplemented by a matrix material such as has been used in the prior art in connection with zeolite catalysts, for example clay, such as kaolin clays, inorganic oxides, such as silica, or silica-alumina, or silica-alumina gels.

Examples 1 and 2 illustrate our prefered cogels.

EXAMPLE 1

5,017 grams of sodium silicate (28% $SiO_2$ + 8.9% $Na_2O$ by weight) equivalent to 1,440 grams of $SiO_2$ is dissolved in water. The solution is acidified to a pH of 11 with sulfuric acid. 26,896 grams of an aluminum sulfate solution (equivalent to 1,560 grams of $Al_2O_3$) is added gradually to the acidified slurry with constant agitation. The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 80° C. The washed filter cake is then slurried to a solid content of about 5% in distilled water which contained about 2% of ammonium nitrate and then filtered. The filter cake is then again slurried with ammonium nitrate solution as in the last previous step. The filter cake from the last step is again reslurried in an ammonium nitrate solution as above and filtered. The filter cake from the last filtration above is washed with distilled water.

The silica-alumina hydrogel thus produced is preferably maintained in a sealed container prior to use in the catalyst of our invention. It should be used as promptly as possible since aging of the gel will impair its properties in producing a good attrition resistant catalyst.

The gel produced as in Example 1 analyzed on a volatile free basis as follows:
$SiO_2$ = 48.7% by weight
$Al_2O_3$ = 51.1% by weight
$Na_2O$ = 0.27% by weight
$NH_3$ = 3.67% by weight
This corresponds to 0.44 equivalents of $NH_4$ per mole of $Al_2O_3$. The $SiO_2/Al_2O_3$ molar ratio is 1.62.

The pore volume, the distribution of the pore volume according to their diameters and the surface area of the gel were determined (see J.A.C.S. [1938] Vol., p. 309, etc.):
Surface area ($M^2$/gram) equals 0.712;
Total pore volume (cc/gram) equals 0.67;
Surface area in pores of 30 to 600 Angstroms diameters equals 457 $M^2$/grams;
Pore volume of pores of 30 to 600 Angstroms diameters equals 0.51 cc/gram;
Percent of pore volume as percent of the volume in poures of 30 to 600 A (Angstroms) equals:
300 to 600 A = 0.1
200 to 300 A = 0.1
100 to 200 A = 0.6
50 to 100 A = 11.2
30 to 50 A = 88
Pore volume distribution as percent in pores of 10 to 300 Angstroms radius pores:

| Pore Radius | | Percent |
|---|---|---|
| 200 to 300 A | = | 0 |
| 150 to 200 A | = | 0 |

-continued

| Pore Radius | | Percent |
|---|---|---|
| 100 to 150 A | = | 0 |
| 50 to 100 A | = | .1 |
| 25 to 50 A | = | 9.7 |
| 10 to 20 A | = | 89.6 |

The ammoniated cogel is amorphous to K alpha copper radiation at 500 counts per second on the counter of the strip chart x-ray apparatus. It showed no discernable peaks in the x-ray spectrum so produced. The gel produced as above, was employed in the following examples, except in Example 19 where the acid gel was used. In all examples and except as is indicated in Example 7, where zerogel was employed, all of the examples employed the hydrogel.

The above cogel was pelleted and tested by the microcativity test identified above after steaming at 1450° F. for two hours (M activity) and again another sample after steaming at 1500° F. for two hours (S activity) and a third sample after steaming for 2 hours at 1550° F. (S+ activity). The results are reported as volume percent conversion.

The results obtained were as follows:

| | M | S | S+ |
|---|---|---|---|
| Volume % conversion: | 43 | 36.5 | 46 |

The gel was also mixed with acid treated halloysite (see Secor; U.S. Pat. Nos. 2,935,463, and 3,446,727) in the ratio of 90% by weight of the dried gel and 10% by weight of the dry halloysite. The mixture was tested as above with the following results:

| | M | S+ |
|---|---|---|
| Volume % conversion | 47 | 44 |

EXAMPLE 2

The procedure of Example 1 was used to form the cogel, but instead of aluminum sulfate, an equivalent amount of $Al_2O_3$, an equivalent amount of aluminum nitrate and sodium aluminate in ratio to give 75% of the $Al_2O_3$ to come from sodium aluminate ($NaAlO_2$) and 25% from the aluminum nitrate. The gel was analyzed with the following results on a volatile free basis:
$SiO_2$ = 49.6%
$Al_2O_3$ = 49.8%
$Na_2O$ = 0.13%
$NH_3$ = 2.40%
The $SiO_2/Al_2O_3$ molar ratio is 1.69.
Surface area $M^2$/gram equals 708;
Pore Volume cc/gram equals 0.84;
Surface area in pores of 30 to 600 Angstroms diameter equals 482 $M^2$/gram;
Pore volume in pores of 30 to 600 Angstroms diameters equal 017 cc/gram;
Pore volume distributuion and percent of pore volume in pores of 30 to 600 Angstroms diameter;
300 to 600 A equals 0.5%
200 to 100 A equals 0.6%
100 to 200 A. equals 7.9%
50 to 100 A equals 50.5%
30 to 50 A equals 40.5%;

Pore volume distribution as percent of pore volume in pores of:
200 to 300 A. equals 0.3%
150 to 200 A equals 0.2%
100 to 150 A. equals 0.5%
50 to 100 A equals 6.0%
25 to 50 A equals 44.6%
10 to 25 A equals 47.5%;

The pore volume is more uniformly distributed between the pores of 30 to 100 Angstrom diameters in comparison with those of the gels of Example 1.

EXAMPLE 3

300 grams (on a volatile free basis) of the silica-alumina gel produced as in Example 1 was mixed with a solution of rare earth sulfate, equivalent to 75 grams of ReO in water to form a slurry containing about 6% of solids. The composition of the rare earth sulfate expressed as oxides and symbolized as ReO was:
$La_2O_3 = 57\%$ by weight
$CeO_2 = 16\%$ by weight
$Nd_2O_3 = 21\%$ by weight
Other rare earth oxides = 7% by weight 100 grams of ReO (volatile free) is equal to 1.896 equivalents of ReO, i.e., 52.7 grams per equivalent.

The ReO was determined by the standard oxalate method. See Roden, "Analytical Chemistry of the Manhatten Project", McGraw-Hill Co., Chapter 22. In all examples ReO was similarly determined and had the above equivalent value.

The above mixture was held at the temperature of about 180° to 200° F. for about two hours at atmospheric pressure. During the reactions, the pH of the mixture was adjusted to hold a pH in the range of 5.2 to 5.4.

The mixture was filtered and washed. A sample of the filter cake was analyzed on a volatile free basis as follows. The filter cake was analyzed:
$SiO_2 = 43.7\%$ by weight
$Al_2O_3 = 46.3\%$ by weight
$Na_2O = 0.64\%$ by weight
$ReO = 10.2\%$ by weight
$NH_3 = 1.25\%$ by weight
$SO_3 = 0.83\%$ by weight The ratio of equivalents of $NH_4$ per mole of $Al_2O_3$ is 0.16 and the ratio of the equivalents of ReO per mole of $Al_2O_3$ is 0.43.

It was amorphous as in the case of the cogel of Example 1.

90% of the dried filter cake was mixed with 10% of acid treated halloysite as in Example 1. The mixture was tested as in Example 2 with the following results:

|  | M | S+ |
| --- | --- | --- |
| Volume % conversion | 62 | 51 |

EXAMPLE 4

The cogel of Example 1 (1000 grams on a volatile free basis) was mixed with lanthanum nitrate solution in an amount to equal 100 grams of ReO (as $La_2O_3$) in water and mixed for one hour at ambient temperatures and then heated for one hour at 160° to 170° F. at a pH of 5.2 to 5.4. The exchanged sample was filtered and washed. The washed filter cake was dried at 250° F. for three to four hours and reexchanged as above, filtered, washed, and dried as above. The exchange as described above was repeated for a third time. The resultant exchanged gel contained (on a volatile free basis):
$SiO_2 = 47.4\%$
$Al_2O_3 = 44.3\%$
$La_2O_3 = 8.21\%$
$NH_3 = 1.14\%$
$Na_2O = 0.07\%$ The exchanged gel was amorphous to x-ray as above. The ratio of the equivalents of $NH_4$ per mole of $Al_2O_3$ is 0.16 and for ReO ($La_2O_3$) the ratio of equivalents per mole of $Al_2O_3$ is 0.35.

The gel was formulated with clay as in Example 1 and tested for microactivity by the above test, with the following results:
M = 63%
S+ = 54%

EXAMPLE 5

300 grams (on a volatile free basis) of the cogel described in Example 1 was mixed with rare earth sulfate as in Example 3, in amount equivalent to 21 grams of ReO as described above in 4,700 ml of water. The pH was adjusted with NaOH to a pH of 8. The mixture was agitated for an hour at a temperature of 160° F. at atmospheric pressure. The slurry was filtered and washed until the wash water was substantially free of sulfate ions. The filter cake was analyzed and its analysis on a volatile free weight basis was as follows:
$SiO_2 = 45.5\%$ by weight
$Al_2O_3 = 46.7\%$ by weight
$Na_2O = 0.23\%$ by weight
$ReO = 7.18\%$ by weight
$NH_3 = 2.14\%$ by weight
$SO_3 = 0.23\%$ by weight The ratio of equivalents of $NH_4$ per mole of $Al_2O_3$ is 0.28 and for ReO, the ratio of equivalents per mole of $Al_2O_3$ is 0.3.

It was composited as in Example 1 (90% gel and 10% acid treated halloysite) and tested as in Example 2 with the following results:

|  | M | S | S+ |
| --- | --- | --- | --- |
| Volume % conversion | 57 | 53 | 47 |

EXAMPLE 6

The gel of Example 1 was exchanged employing a lanthanum nitrate in solution, in an amount equal to 10% of the gel, both on a volatile free basis. The mixture was held for an hour at ambient temperature at a pH of 5.2 to 5.4, and then heated at a temperature of 160° F. to 170° F. for an hour. The gel was then filtered and the filter cake was washed and dried. The exchanged gel was reslurried in water and reexchanged as described above, filtered, and the filter ckae washed and dried. It was analyzed with the following results:
$La_2O_3 = 8.34\%$
$NH_3 = 0.98\%$
$Na_2O = 0.12\%$ A thousand grams of this gel (on a volatile free basis) was then reslurried in water containing 2,500 grams of ammonium sulfate (on a volatile free basis) to a total volume of 20,000 ml. The mixture was adjusted to a pH of 5 to 5.2 and held for one hour at ambient temperatures, and then charged into an autoclave where it was held for two hours at a temperature of 400° F., filtered, washed, and analyzed with the following results:
ReO (La$_2$O$_3$) = trace
NH$_3$ = 3.09%
Na$_2$O = 0.05%
SO$_3$ = 4.60%

The high concentration of SO$_3$ indicates that it was contaminated with considerable ammonium sulfate, since the original ReO exchanged gel was sulfate free. The NH$_3$ equivalent to the SO$_3$ content should then be subtracted from the 3.09% of the ammonia to indicate the ammonia remaining in the gel in exchanged position to wit equal to 0.57%. The gel was formulated as in Example 1 and tested for activity with the following results:
M = 66%
S+ = 60%

The gel showed a small percentage of an incipient crystallinity of indeterminate character.

EXAMPLE 7

The gel of Example 1 was dried at 400° F. and the dried mass was reduced to a powder in a hammer mill. The ammoniated xerogel product was dispersed in ammonium sulfate solution containing 10% by weight of the sulfate based on the gel on a volatile free basis. The suspension was digested for thirty minutes at 160° F. The treated slurry was dried and reexchanged as above, drained, and again reexchanged as above, employing in this case 40% of ammonium sulfate based on the gel on a volatile free basis. The gel resulting from the third exchange was filtered and washed. It was analyzed with the following results (volatile free basis):
NH$_3$ = 3.32%
Na$_2$O = 0.2%

The sulfate contents of the filter cake was not determined.

It was amorphous as was disclosed by the x-ray pattern taken as in Example 1. The gel was formulated into a catalyst as in Example 1, and tested for activity with the following results:
M = 60%
S+ = 52%

EXAMPLE 8

200 grams (volatile free) of the gel of Example 1 were dispersed in water containing 200 grams (on a volatile free basis) of NH$_4$NO$_3$ in two liters of water. The pH of the dispersion was adjusted to a pH of about 4 to about 4.5 and heated for two hours at 160° F. The gel was filtered and washed until the wash water appeared nitrate free. The exchanged gel was analyzed for NH$_3$. The NH$_3$ content of the filter cake was 3.4 on a volatile free basis. The nitrate content of the filter cake was not determined.

The x-ray spectrum obtained as described in Example 1 showed a small percentage of an incipient crystallinity of undeterminate characteristics. The x-ray spectrum showed peaks whose d spacings correspond to an average a$_o$ of 25.48 angstroms. (See in this connection our copending application, Ser. No. 003,879 now U.S. Pat. No. 4,238,360.)

It was combined with the acid treated clay as in Example 1 and tested for M microactivity. The activity was:
Volume % conversion = 58%

EXAMPLE 9

The cogel prepared as in Example 1 was heated to 600° to 700° F., and steamed at a temperature of about 1200° F. was passed over the heated cogel for three hours. The cooled cogel was then treated with rare earth as in Example 3. The steamed gel after treatment with the rare earth sulfate was filtered and the filter cake was washed, as in Example 3. It had the following compositions by weight on a volatile free basis:
SiO$_2$ = 46.4% by weight
Al$_2$O$_3$ = 50.8% by weight
Na$_2$O = 0.20% by weight
ReO = 2.09% by weight
NH$_3$ = 1.05% by weight
SO$_3$ = 0.48% by weight The ratio of the equivalents of NH$_4$ per mole fo Al$_2$O$_3$ is 0.12, and for ReO the ratio of equivalents per mole of Al$_2$O$_3$ is 0.1.

The treated cogel was mixed with acid treated halloysite as in Example 1 (90% cogel and 10% halloysite) and tested as in Example 1 with the following results:

|  | M | S | S+ |
|---|---|---|---|
| Volume % conversion | 66 | 52 | 51 |

EXAMPLE 10

1,600 grams of the cogel prepared as in Example 1 (calculated on a volatile free basis) was mixed gradually with 18.4 liters of a rare earth sulfate solution containing 1.96% ReO (23% by weight of the gel) while the mixture was maintained for about an hour at a pH of 5 by adjustment during the mixing. The above slurry was then introduced into an autoclave and heated at a temperature of 400° F. for about two hours. The mixture was then cooled and filtered. The filter cake was washed until the wash water appeared substantially free of sulfate ions. The filter cake analyzed on a volatile free basis as follows:
SiO$_2$ = 45.6% by weight
Al$_2$O$_3$ = 48.8% by weight
Na$_2$O = 0.06% by weight
ReO = 4.15% by weight
NH$_3$ = 0.3% by weight
SO$_3$ = 0.67% by weight The ratio of equivalents of NH$_3$ per mole of Al$_2$O$_3$ is 0.04, and for ReO, the ratio of equivalents per mole of Al$_2$O$_3$ is 0.13.

The filter cake was x-rayed as in Example 1 and the "d" spacings and intensities (I) of the corresponding lines measured as the height of the peaks on the strip chart were determined.

TABLE 1

| d | I |
|---|---|
| 6.39 | .6 |
| 6.26 | 24 |
| 4.58 | 3 |
| 3.57 | 3 |
| 3.49 | 3 |
| 3.41 | 2 |
| 3.24 | 2 |
| 3.14 | 3 |
| 3.00 | 10 |
| 2.86 | 3 |
| 2.43 | 2 |

TABLE 1-continued

| d | I |
|---|---|
| 2.21 | 6 |

The cogel treated as above was slurried in water with 10% of acid treated halloysite and 90% of the cogel all measured on a volatile free basis as in Example 1 and subjected to the above test as set forth in Example 1 with the following results:

|  | M | S | S+ |
|---|---|---|---|
| Volume % conversion | 77 | 62 | 56 |

EXAMPLE 11

The preparation of Example 10 was carried out as described but instead of rare earth sulfate, ammonium sulfate was employed.

1200 grams (on a volatile free basis) was added gradually to 12,000 cc of water containing 3,000 grams of $(NH_4)_2SO_4$ (on a volatile free basis). The pH was adjusted during addition to a pH of 5.5. The slurry was autoclaved for two hours at 400° F., cooled and filtered. The filter cake was washed until the wash water was substantially free of sulfate ions.

The gel was analyzed on a volatile free basis:
$SiO_2$ = 48.2% by weight
$Al_2O_3$ = 51.3% by weight
$Na_2O$ = 0.10% by weight
$NH_3$ = 2.43% by weight
$SO_3$ = 0.99% by weight Since the $SO_3$ is introduced by the ammonium sulfate, the net $NH_3+$ in exchange position is equal to 2.0% after subtracting the $NH_3$ equivalent to the $SO_3$. This corresponds to 0.24 equivalents of $NH_4$ per mole of $Al_2O_3$.

90% of the gel was mixed with 10% of acid treated halloysite as above and tested as in Example 1.

|  | M | S | S+ |
|---|---|---|---|
| Volume % conversion | 63 | 59 | 58 |

It will be noted that notwithstanding the presence of about 55 equivalents of $NH_4+$ per liter, the treatment resulted in a reduction of the $NH_4$ content from 3.67% in the ammoniated gel of Example 1 to 2.0% in the treated gel.

EXAMPLE 12

The procedure of Example 10 was repeated except that the ReO was used in the ratio of 10% by weight of the gel. The exchanged gel had the following composition:
$SiO_2$ = 44%
$Al_2O_3$ = 47.6%
ReO = 6.81%
$NH_3$ = 0.75%
$Na_2O$ = 0.06%

This corresponds to a ratio of equivalents of $NH_4$ per mole of $Al_2O_3$ of 0.09 and of ReO the ratio of equivalents per mole of $Al_2O_3$ is 0.27.

Examined by x-ray as in Example 1, the pattern showed that the gel contained a crystalline phase substantially different from the product of Example 10.

The following Table 2 states the "d" spacings of the reflections.

TABLE 2

| d (Angstroms) | I |
|---|---|
| 8.44 | 44 |
| 4.75 | 4 |
| 4.47 | 5 |
| 4.24 | 4 |
| 4.16 | 3 |
| 3.96 | 3 |
| 3.76 | 3 |
| 3.26 | 4 |
| 3.04 | 3 |
| 2.33 | 2 |

The exchanged gel when formulated as in Example 1 had the following results:
M = 68.4%
S+ = 61.6%

EXAMPLE 13

In this example, the gel as in Example 1 was exchanged with magnesium nitrate as a pH of 4 under autogenous pressure at a temperature of 400° F. for two hours, cooled, filtered and washed. The filter cake was analyzed and had the following composition on a volatile free basis:
$Al_2O_3$ = 50.4% by weight
$SiO_2$ = 46.9% by weight
$Na_2O$ = 0.09% by weight
$NH_3$ = 0.88% by weight
$MgO$ = 0.56% by weight
$NO_3$ = 0.64% by weight This corresponds to 0.06 equivalents of $NH_4$ per mole of $Al_2O_3$.

The x-ray pattern produced as in Example 1 showed the following reflections reported as "d" spacings.

TABLE 3

| d (Angstroms) | I |
|---|---|
| 7.22 | 7 |
| 4.43 | 5 |
| 4.28 | 2 |
| 3.61 | 3 |
| 3.56 | 3 |
| 3.35 | 14 |
| 2.56 | 2 |
| 2.35 | 5 |

90% of the gel was mixed with 10% acid treated halloysite and tested as in Example 1 with the following results:
M = 56%
S+ = 45%

EXAMPLE 14

50 grams of the gel of Example 1 were mixed with 1,000 ml of deionized water. The mixture had a pH of about 5.5 and was heated under pressure at a temperature of 400° F., for two hours, cooled and filtered. The filtrate contained ammonium ions equivalent to 0.374 grams of $NH_3$ per liter. This indicates that the pH was raised to the equivalent value, i.e., substantially to neutrality.

The gel was analyzed and found to have lost about a quarter of its ammonium. The x-ray spectrum obtained as in Example 1 showed that the treated gel was amorphous. It was formulated as in Example 1 and had an M activity of 48% and S+ activity of 37%.

The following examples indicate that the hydrothermal treatment may be carried on for too long a time or an excessively high temperature or both with disadvantageous effect on the catalytic activity of the resultant catalyst. This effect may occur in the case where the resultant gel is either amorphous or contains a crystalline phase. In the latter, the crystallinity is of a different character from the more mildly treated ammoniated gel.

EXAMPLE 15

Example 10 was repeated but the temperature was adjusted to 500° F., and the ReO was employed in a ratio of 33% of the gel on a volatile free basis, and the digestion was carried on for eight (8) hours and another for twenty-four (24) hours.

The exchanged gel was analyzed with the following results:

|  | | SAMPLE | |
|---|---|---|---|
|  | | 1<br>8 hours | 2<br>24 hours |
| $SiO_2$ | = | 40.6% | 44.6% |
| $Al_2O_3$ | = | 44.3% | 45.2% |
| ReO | = | 8.53% | 9.08% |
| $NH_3$ | = | 0.55% | 1.17% |
| $Na_2O$ | = | 0.83% | 0.17% |

The ratio of equivalents of $NH_4$ per mole of $Al_2O_3$ for Sample 1 is 0.07, and for Sample 2, it is 0.16; for ReO for Sample 1, the ratio of equivalents per mole of $Al_2O_3$ is 0.38, and for Sample 2, it is 0.39.

The x-ray pattern obtained as in Example 1 showed a d spacing which corresponds for Sample 1 to an average $a_o$ of 25.40 Angstroms and for Sample 2, an average $a_o$ of 24.56 Angstroms (see our application Ser. No. 003,879 now U.S. Pat. No. 4,238,360;).

Formulates as in Example 1, the activity of the catalyst was:

|  | Sample 1 | Sample 2 |
|---|---|---|
| M | 53 | 41.4 |
| S− | 46.4 | 43.1 |

EXAMPLE 16

The gel of Example 1 was that exchanged using rare earth sulfate of Example 3 equal to 10% of the weight of the gel on a volatile free basis, and the digestion was carried out for twenty-four (24) hours at 212° F. The resultant washed gel had the following composition:
$SiO_2$=48.7%
$Al_2O_3$=40.9%
ReO=7.7%
$NH_3$=0.60%
$SO_3$=0.81%

The corresponding equivaltent of $NH_4$ per mole of $Al_2O_3$ is 0.1 and for ReO the equivalent ratio per mole of $Al_2O_3$ is 0.37.

It was amorphous to x-ray as above. The gel was tested for microactivity with the following results:
M=45.6%
S+=42.0%

EXAMPLE 17

A gel formed as in Example 1 was exchanged with ammonium nitrate at a temperature of about 160° F. to 170° F. for one (1) hour. The pH was adjusted during the exchange with ammonium hydroxide to hold the pH in a range of 5 to 5.2. The mixture was filtered and dried and reexchanged as above. The washed filter cake was exchanged with lanthanum chloride at 250° F. for two (2) hours at a pH of 5 to 5.2. The exchanged zeolite was filtered and washed.

The filter cake analyzed as follows, on a volatile free basis:
$SiO_2$=48.1%
$Al_2O_3$=42.8%
$Na_2O$=0.027%
$NH_3$=1.95%
$La_2O_3$=7.74%

The ratio of equivalents of $NH_4$ per mole of $Al_2O_3$ is 0.26, and the ratio of equivalents of $La_2O_3$ per mole of $Al_2O_3$ is 0.31.

The exchanged gel was amorphous to x-ray as in the case of Example 1. The exchanged zeolite was mixed with acid treated clay as in Example 1 and tested for microactivity with the following results:
M=64%
S+=55%

EXAMPLE 18

A gel formed as in Example 2 was exchanged with rare earth sulfate at a temperature of 200° F. for three (3) hours and then filtered. The filtrate had a pH of 5.5. The filter cake was washed. A similar second exchange was for three (3) hours and the third similar exchange was for two and a half (2½) hours, both at pH adjusted to 5.1 to 5.3. The washed filter cake from the third exchange was analyzed as follows, on a volatile free basis:
$SiO_2$=50.0%
$Al_2O_3$=45.8%
$Na_2O$=0.14%
ReO=4.20%
$NH_3$=0.30%

The ratio of equivalents of $NH_4$ per mole of $Al_2O_3$ is 0.24 and for ReO the ratio of equivalents per mole of $Al_2O_3$ is 0.18.

The exchanged gel was amorphous to x-ray as in Example 1. The filter cake was formulated as in Example 1 and tested for activity with the following results:
M=67%
S+=55%

EXAMPLE 19

In this example an acid gel was employed instead of an ammoniated gel.

Sodium silicate in an amount equivalent to 480 grams of $SiO_2$ (volatile free) and 520 grams of $Al_2O_3$ (volatile free) as aluminum sulfate were mixed in water so as to establish a gel (5% solids), i.e. $SiO_2/Al_2O_3$ molar ratio of 1.6. They were thoroughly mixed. The pH during mixing was adjusted to a pH at about 6.5 by the addition of sulfuric acid. The mixture was heated to about 160° F. for an hour and filtered and washed until the wash water was substantially free of sulfate ions.

The washed gel was exchanged employed a ratio of ReO to gel of 33 grams of ReO as rare earth salt per hundred grams of the gel (on a volatile free basis). The mixture was adjusted with acid to a pH of about 5 thoroughly mixed for about an hour and introduced into an autoclave and heated for two hours at 400° F. It was then cooled and filtered and the filter cake washed thoroughly. The exchanged gel analyzed on a volatile free basis as follows:
$Na_2O = 0.007\%$
$ReO = nil$
$NH_4 = nil$ The filter cake was combined with clay as in Example 1 and tested for microactivity with the following results:
$M = 67.5\%$
$S+ = 48.7\%$ The treated gel showed no crystal structure by the x-ray examination as in Example 1. It was amorphous.

The following examples illustrate the effect of the $SiO_2/Al_2O_3$ molar ratio of the ammoniated gel on its activity.

EXAMPLE 20

A gel prepared according to the procedure of Example 1, with the silicate and aluminum salt adjusted in composition to give the following $SiO_2/Al_2O_3$ ratio. It was analyzed as in Example 1, and had the following composition:
$SiO_2 = 25.0\%$ by weight
$Al_2O_3 = 74.2\%$ by weight
$Na_2O = 0.033\%$ by weight
$NH_3 = 0.25\%$ by weight
The $SiO_2/Al_2O_3$ molar ratio is 0.57.

It was formulated and tested as in Example 1, with the following results:
$M = 55\%$
$S+ = 51.7\%$ The gel of Example 20 wax exchanged under pressure and processed as in Example 10. It analyzed as follows:
$ReO = 0.15\%$ by weight
$NH_3 = 0.24\%$ by weight It was formulated with a catalyst and tested as in Example 1 with the following result:
$M = 53\%$ by weight

EXAMPLE 21

Another gel was formed as in Example 1, but the ratio of the reactants was adjusted to produce a gel containing 75% $SiO_2$ and 25% $Al_2O_3$ by weight.

The resultant gel analyzed as follows:
$SiO_2 = 73.0\%$ by weight
$Al_2O_3 = 26.3\%$ by weight
$Na_2O = 0.08\%$ by weight
$NH_3 = 1.06\%$ by weight
The $SiO_2/Al_2O_3$ molar ratio is 4.72.

EXAMPLE 22

The ammoniated gel which we prefer to employ has a $SiO_2/Al_2O_3$ ratio in the range of about 1 to about 3. Ammoniated gels which have $SiO_2/Al_2O_3$ ratio substantially outside this range do not on deammoniation by the process of our invention attanin an activities which is obtainable when employing the preferred gels.

It will be seen that the reduction in the content of ammonium cation by the hydrolytic exchange was accompanied by a substantial increase in activity. The activity appears to be a funtion of the ammonium content of the exchanged gel. The lower the equivalents of $NH_4$ (reported as $NH_3$) per mole of $Al_2O_3$ the higher the M and S+ activity.

The level of activity depends to some estent on the cations employed. Thus compare the exchange with magnesium cation of Example 13 with Example 12 where the exchange was with an acid solution of rare earth salts. The magnesium salt, where the deammoniation was the greater than with the rare earth salt, the improvement in activity achieved by the exchange with magnesium ion yielded an M of 56% and an S+ of 45%, compared with M of 68% and an S+ of 62% for Example 12.

We prefer to employ the rare earth cations under acid conditions. While some appreciateion in activity is obtained when using the rare earth salts under mild alkaline conditions, the appreciateion in activity is not obtained for like amount of deammoniation. Compare Example 5 with Example 17.

In employing rare earth surfate for the exchange salt in the hydrolytic treatment of the gel, the improvement in activity obtained by the deammoniation may be depreciated if the temperature or the time of digestion or both are made excessive.

While we do not wish to be bound by any theory of why the facts are as observed, the data tend to indicate that the hydrolytically treated gel forms, whether it be a crystalline or amorphous, a catalytically active structure which is a metastable form. Continued treatment or excessive temperature transforms the gel and depreciates its activity.

Those skilled in the art will understand from the above disclosure how to determine temperatures, times, cation selection, and concentration to obtain the desired level of activity. The examples illustrate the procedure and result effective parameters and may act as a guide to those who wish to determine these parameters for their particular conditions and desired result.

The following example illustrates the qualities of the catalysts produced by a combination of the hydrothermally treated gel of our invention with a crystalline alumino-silicate faujasite zeolite. Such novel composite catalysts have a superior hydrothermal stability and catalytic activity to produce a high octane gasoline.

Example 21 illustrates the excellent activity of the mixture of the rare earth exchanged alumina-silica gel of our invention in a mixture with a faujasite type zeolite.

It is our presently preferred embodiment of our invention when the hydrothermally treated gel is employed in combination with a faujasite.

EXAMPLE 23

A Na Y zeolite having an $SiO_2/Al_2O_3$ ratio of 4.74 was dispersed in water and acidified with sulfuric acid to a pH of about 3.5. The resultant slurry was heated to a temperature of 160° F. to 180° F. with a rare earth salt solution employing the rare earth sulfate of Example 10.

The washed filter cake of the above slurry was analyzed and contained 10.8% ReO and 3.8% $Na_2O$ on a volatile free basis. The 19% of the exchanged zeolite 47% ball clay when formulated with 16% acid treated halloysite and 18% pseudoboehmite in a slurry and spray dried and tested by the above microactivity test with the following results:
$M = 73\%$
$S+ = 30\%$ A portion of the above filter cake was mixed with the washed filter cake of the exchanged silica-alumina gel of Example 10 in the ratio to give 10% rare earth exchanged Y zeolite and 90% of the exchanged gel on a volatile free basis. The slurry of the mixed filter cakes was dried.

The resultant catalyst containing the zeolite and gel was tested by the above microactivity test with the following results:

M = 83%
S+ = 73%

This activity may be compared with that of the catalyst referred to previously in this Example 23. The spray dried slurry of the mixed filter cake as above, was tested by the fluid cracking test.

A test oil (ASTM Subcommitted D32, Standard FHC 893) is vaporized and passed through a bed of microspheres produced by the above spray drying of the mixed filter cakes. Spray dried microspheres are of a particle size within the range of 50 to 70 microns.

In the particular test, the catalyst charge was 4.00±0.05 grams and 2.33±0.03 grams of oil was passed through the catalyst bed over a period of 75 seconds. The catalyst was prepared by heating a shallow bed of the catalyst for three hours in air at 1050° F. and then steamed as in the above microactivity test at 1450° F. for two (2) hours and another sample was steamed at 1550° F. for two (2) hours. The oil passed through a preheat zone and through a bed of the microspheres maintained at a temperature of 900° F.±2° F. at a weight hourly space velocity (WHSV) of 16.

$$WHSV = 1.33/4 \cdot 3600/75 = 16$$

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which boiled above 421° F. and the fraction of the liquid condensate boiling below 421° F. is determined. The volume and temperature of the gases collected over the water are measured and the volume reduced to standard conditions. The uncondensed gases are analyzed and the weight percent of the gases which is hydrogen, isopentane, and hexane is determined and their weight percent of the feed determined. The weight percent conversion of the liquid charge is determined from the following relation:

F is the weight in grams of the oil passing through the reactor;
L is the weight in grams of the liquid product which is collected as condensate;
R is the percent by weight in grmas of the fraction of the liquid condensate which boils above 421° F.;
H is the grams of liquid held up in the reactor exit line and around the reactor, receiver, and joints.

In the above test it has been determined that H constitutes three percent of the feed F. The weight percent conversion (%C) is given by the following relationship.

$$\%C = \frac{F - \frac{R \cdot L}{100} - .03H}{F} \cdot 100$$

The weight percent of the gasoline is given by the sum of the percent by the weight to the fraction boiling below 421° F. and the weight percent of the isopentane and hexand.

The coke which is deposited on the catalyst is obtained by burning the coke off of the catalyst remaining after the test and the weight of carbon deposited is determined from the $CO_2$ generated. The weight percent of the feed which appears as carbon is thus determined.

The spray dried microspheres which were heated with steam at 1450° F. and another sample which was heated at 1550° F. each for two (2) hours as above, were each tested by the above test with the following results:

| °F. | Conversion Wt. % | Gasoline % | Coke % | Hydrogen | Isobutane |
|---|---|---|---|---|---|
| 1450° | 72.7% | 45.4% | 6.60% | .077 | 5.18 |
| 1550° | 57.1% | 36.51% | 5.73% | .082 | 2.29 |

The gasoline had a 90.6 octane value according to the test procedure described in: Anderson, et al. "Calculation of the Research Octane Number of Motor Gasoline from Gas Chromatograph Data and a New Approach to Motor Gasoline Quality Control", Journal of the Institute of Petroleum, Vol. 53, March 1972, pp. 83–94.

When using the above exchanged ammoniated gel with a zeolite, we prefer to use the exchanged gel mixed with the rare earth exchanged zeolites of the prior art with an $Na_2O$ content of less than about 4–5%, for example 3.5% and preferably the so-called A type (see U.S. Pat. No. 4,100,108); we prefer to employ the Y zeolite of an $SiO_2/Al_2O_3$ ratio of above 4, for example, 4.5. The percent of the zeolites and the gel on a volatile free basis may be about 5% to 25% of the mixture, the exchanged gel.

Our invention relates to a process of the combining of a CAS zeolite with a hydrolytically treated silica-alumina cogel. The hydrolytic treatment may be that of acid silica-alumina gels or ammoniated silica-alumina gels of low sodium content. The gels in the combination have a weight ratio in the range of less than about 1% expressed as $Na_2O$ and having an $SiO_2/Al_2O_3$ mole ratio less than 4 and preferably in the range of about 1 to about 3. In the case of the ammoniated gels, containing $NH_4$ cations associated with the gel in amount expressed as equivalents of $NH_4$ per mole of $Al_2O_3$ in excess of about 0.3 to reduce the content of $NH_4^+$ to substantially less than about 0.3 equivalents per mole of $Al_2O_3$.

The preferred embodiment of our invention includes the treatment of an ammoniated gel with rare earth cations under acid conditions at temperatures above about 150° F. for a time to reduce the $NH_4$ ion content in the gel to less than about 0.15 equivalents of $NH_4$ per mole of $Al_2O_3$ and to employ for such purposes a cogel with a $SiO_2/Al_2O_3$ molar ratio substantially more than 1 and less than 3 and its combination with a suitable CAS zeolite.

For purposes of maintaining the treated product in an amorphous condition, we prefer to maintain the temperature from about 150° F. to the boiling point under atmospheric conditions.

For purposes of generating a crystalline phase in the gel for combination with a CAS zeolite, we prefer to carry out the hydrothermal treatment under autogenous pressure at temperatures up to about 450° F., i.e. 225° F. to about 450° F.

The time of digestion is controlled so as not to be excessive as described above. The time of digestion may be from about one (1) hour to about two (2) to four (4) hours at the above temperatures.

The above procedures for reducing the NH₄ content of the ammoniated gel may be employed in combination. Thus the ammoniated gel of Example 1 may be exchanged at atomspheric pressure and reexchanged one or more times in multiple steps. The atmospheric exchanged gel of Example 3 may be reexchanged under pressure under similar procedures as in Example 6. The exchanged gel of Example 3 may be steamed as in Example 5 and exchanged as in Example 5.

Our invention also relates to the combination of a CAS zeolite and a silica-alumina cogel having an $SiO_2/Al_2O_3$ ratio of less than 4 preferably in the range of about 1 to about 3 which have been produced by the process of our invention.

The preferred gel is one which has a silica-alumina mole ratio of more than about 1 and up to about 2 and a NH₄ content of less than about 0.15 equivalents per mole of $Al_2O_3$ and rare earth cations of about 0.5 to about 5 equivalents per mole of $Al_2O_3$.

Instead of employing the exchange zeolite and the hydrothermally treated gel as in Example 23 the sodium CAS zeolite, for example the rare earth exchanged Y of Example 23 is mixed with the slurry of the washed filtered ammoniated gel of Example 1 or Example 2 in a ratio of about 20% of the zeolite to about 80% of the gel on a volatile free basis. The mixture is digested as in Examples 3 through 22, either with ammonium sulfate or rare earth salts to reduce the sodium content of the CAS, preferably to less than 2% expressed as $Na_2O$ based on the zeolite on a volatile free basis.

Preferably we carry out the exchange of the mixed CAS zeolite and cogel under superatmospheric pressure and pouring rare earth cations at temperatures of about 250° F. to 450° F. to reduce the sodium content of the CAS to less than about 2% (expressed as $Na_2O$), and preferably less than 1% based on the CAS zeolite in the mixture on a volatile free basis and to reduce the ammonium content to less than 0.2 equivalents of NH₄ per mole of $Al_2O_3$ based on the gel in the catalyst. For the purposes of this calculation, the silica to alumina ratio of the CAS zeolite and the zeolite content of the mixture and the silica to alumina ratio of the gel and its percent in the mixture is taken on a nominal basis as established by the above mixture prior to hydrothermal treatment.

The treated mixture of exchanged crystalline alumino-silicate zeolite and the exchanged gel is washed until the wash water is substantially free of the anion used in the exchange process and the washed filter cake is spray dried.

An alternative procedure, according to our invention, is to combine the sodium containing CAS zeolite, for example Na Y with the ingredients used to form the alumina/silica cogel and to exchange the mixture with a solution containing a cation other than an alkali metal cation. Thus, the process of Example 1 or Example 2 may be carried out by mixing the gel forming ingredients with the CAS solution. The mixture may be made alkaline with ammonium hydroxide as in Example 1.

The encapsulated gel zeolite thus formed, may be further exchanged with ammonium salt filtered and washed. The wash slurry may then be hydrothermally treated as in Example 3-21.

Preferably the exchange is carried out under superatmospheric conditions at a temperature of about 250° F. to 450° F. with a rare earth salt solution to reduce the sodium content (expressed as $Na_2O$) to less than about 2% based on the zeolite on a volatile free basis and an NH₄ content of less than 0.2 equivalents of NH₄ per $Al_2O_3$ of the original gel as above.

The above gel-zeolite combination may be combined with other matrix materials such as in ratio to include from about 5 to about 30% of the zeolite and from about 20 to about 50% of the gel, treated as above, the remaining portion may be clays and other inorganic oxides such as have been employed in catalysts employing CAS zeolites.

The gel-zeolite combination prior to exchange or after partial exchange of the zeolite or zeolite gel combination may be spray dried and the spray dried microspheres further exchanged according to the procedures of Example 3-21.

The catalyst may be employed not only as cracking catlysts to produce gasoline of a superior octane, but may be used in other hydrocarbon conversion processes, such as hydroforming, hydrocracking, hydrodisulfurizing processes, for which zeolite catalysts or a silicagel catalysts have been employed in the prior art. In this connection the zeolite-gel combination of our invention may be promoted by addition of metal or metallic oxides or sulfides or other compounds employed to promote the activity of crystalline zeolites or gel catalysts for such purposes.

We claim:

1. The process of producing a cracking catalyst which comprises forming an ammoniated silica-alumina gel having an $SiO_2/Al_2O_3$ molar ratio of more than about one and less than about 3 and associated with sodium ions expressed as $Na_2O$ of substantially less than about 1% based on the gel on a volatile free basis, mixing the same with a crystalline alumino silicate, and treating said ammoniated gel and said crystalline alumino silicate by heating said mixture in a solution containing monovalent cations other than alkali metal cations, or polyvalent cations, or both said cations and separating said mixture of said gel and crystalline alumino silicate.

2. A process for producing an active cracking catalyst which comprises mixing a crystalline alumino-silicate zeolite having a sodium content expressed as $Na_2O$, substantially more than 5% by weight of the zeolite on a volatile free basis, with an ammoniated silica-alumina gel containing NH₄ ions associated with the gel in an amount, substantially in excess of about 0.3 equivalents per mole of alumina ($Al_2O_3$), and having an $SiO_2/Al_2O_3$ molar ratio in the range of about 1 to less than 3, heating said zeolite and gel at a temperature of from about 150° F. to about 450° F. in with a solution of a salt of a monovalent cation other than alkali metal cation, or a polyvalent cation, or both said cations, and reducing the NH₄ in the treated composite to an amount equivalent to substantially less than 0.3 equivalents per mole of $Al_2O_3$ in the first mentioned gel and reducing the sodium content in the mixture of the treated crystalline alumino-silicate zeolite, and gel, to an amount equivalent to less than 5% by weight of the zeolite on a volatile free basis.

3. The process of producing a cracking catalyst which comprises forming a silica-alumina gel having an $SiO_2/Al_2O_3$ molar ratio of more than about 1, and less than about 2.5, and associated with sodium ions expressed as $Na_2O$ of substantially less than about 1% based on the gel on a volatile free basis, mixing the same with a crystalline alumino silicate Y zeolite and treating said gel, and said Y zeolite, by heating said gel and zeolite in a solution containing monovalent cations other than alkali metal cations, or polyvalent cations, or both said cations, and separating said gel and Y zeolite.

4. A process for producing an active cracking catalyst which comprises mixing a crystalline alumino silicate Y zeolite having a sodium content expressed as $Na_2O$, substantially more than 5% by weight of the zeolite on a volatile free basis, with an ammoniated silica-alumina gel containing $NH_4$ ions associated with the gel in an amount, substantially in excess of about 0.3 equivalents per mole of alumina ($Al_2O_3$), and having an $SiO_2/Al_2O_3$ molar ratio in the range of about 1 to less than 3, heating said zeolite and gel at a temperature of from about 150° F. to about 450° F. in a solution of a salt of a monovalent cation other than alkali metal cation, or a polyvalent cation, or both said cations, and reducing the $NH_4$ in the treated composite to an amount equivalent to substantially less than 0.3 equivalents per mole of $Al_2O_3$ in the first mentioned gel and reducing the sodium content in the mixture of zeolite and gel equivalent to an amount equivalent to $Na_2O$, on a volatile free basis, to less than 5% by weight of the zeolite on a volatile free basis.

5. The process of claim 1, 2, 3, or 4, including heating said ammoniated gel and crystalline alumino silicate during said exchange at a temperature of about 150° F. to about 450° F.

6. The process of claim 1, 2, 3 or 4 in which the solution is acidified.

7. The process of claim 1, 2, 3, or 4, in which the cation in the solution contains a rare earth cation and said crystalline alumino-silicate is a faujasite type zeolite.

8. The process of claim 1, 2, 3, or 4, including heating said crystalline alumino silicate encapsulated with the ammoniated gel during said exchange at a temperature of about 150° F. to about 450° F.

9. The process of claim 1, 2, 3, or 4, in which the cation in the solution is a rare earth cation, and said crystalline alumino silicate is encapsulated with the ammoniated gel and the encapsulated crystalline alumino silicate and the said solution is maintained at a temperature of about 150° F. to about 400° F.

* * * * *